(12) United States Patent
Bell et al.

(10) Patent No.: US 9,495,670 B2
(45) Date of Patent: Nov. 15, 2016

(54) QUICK LEGEND RECEIPT SYSTEM

(71) Applicant: Square, Inc., San Francisco, CA (US)

(72) Inventors: Bruce Bell, New York, NY (US);
Mathew Wilson, Sausalito, CA (US);
Gerard Knight, New York, NY (US)

(73) Assignee: Square, Inc., San Fransisco, CA (US)

( * ) Notice: Subject to any disclaimer, the term of this patent is extended or adjusted under 35 U.S.C. 154(b) by 0 days.

(21) Appl. No.: 14/252,712

(22) Filed: Apr. 14, 2014

(65) Prior Publication Data

US 2015/0254627 A1 Sep. 10, 2015

Related U.S. Application Data

(60) Provisional application No. 61/950,697, filed on Mar. 10, 2014.

(51) Int. Cl.
| | |
|---|---|
| G07G 1/12 | (2006.01) |
| G07G 5/00 | (2006.01) |
| G06Q 20/20 | (2012.01) |
| G06Q 30/00 | (2012.01) |
| G06Q 20/22 | (2012.01) |
| G06Q 20/32 | (2012.01) |

(52) U.S. Cl.
CPC .......... *G06Q 20/209* (2013.01); *G06Q 20/202* (2013.01); *G06Q 20/204* (2013.01); *G06Q 20/29* (2013.01); *G06Q 20/32* (2013.01); *G06Q 30/00* (2013.01); *G07G 5/00* (2013.01)

(58) Field of Classification Search
None
See application file for complete search history.

(56) References Cited

U.S. PATENT DOCUMENTS

| | | |
|---|---|---|
| D376,386 S | 12/1996 | Sisilli |
| D547,371 S | 7/2007 | Miller |
| 7,415,492 B2 * | 8/2008 | Soliman ........................ 708/130 |
| D621,872 S | 8/2010 | Jordan |
| D641,040 S | 7/2011 | Tetrault |
| D657,414 S | 4/2012 | Liu et al. |
| 8,180,682 B2 | 5/2012 | Narayanaswami et al. |

(Continued)

OTHER PUBLICATIONS

Non-Final Office Action mailed Oct. 1, 2014, U.S. Appl. No. 14/252,714 of Bell, B., et al., filed Apr. 14, 2014.
U.S. Appl. No. 29/484,510 of Bell, B., et al., filed Mar. 10, 2014.
U.S. Appl. No. 14/252,714 of Bell, B., et al., filed Apr. 14, 2014.
U.S. Appl. No. 14/252,716 of Bell, B., et al., filed Apr. 14, 2014.

(Continued)

*Primary Examiner* — Fateh M Obaid
(74) *Attorney, Agent, or Firm* — Perkins Cole LLP

(57) ABSTRACT

Techniques are disclosed for enabling more efficient tipping by providing a merchant the ability to reduce the time used on manually entering tip amounts. In one embodiment, a method includes automatically generating, by a point-of-sale (POS) system, a transaction receipt that indicates a plurality of selectable tip options, wherein said automatically generating the transaction receipt is based on one or more rules specified by a user of the POS system. The method further includes causing the transaction receipt to be printed as a printed receipt. The method further includes identifying, by the POS system, a one of the plurality of selectable tip options specified by a customer on the printed receipt. Among other benefits, the disclosed techniques reduce the time and effort the merchant needs to spend on collating the tipping at end of the business day.

28 Claims, 10 Drawing Sheets

(56) References Cited

U.S. PATENT DOCUMENTS

| | | | |
|---|---|---|---|
| 8,224,700 | B2 | 7/2012 | Silver |
| 8,396,808 | B2 | 3/2013 | Greenspan |
| 8,595,075 | B2* | 11/2013 | de Sylva ............... 705/24 |
| 2004/0054592 | A1* | 3/2004 | Hernblad ............... 705/15 |
| 2004/0158494 | A1* | 8/2004 | Suthar ............... 705/15 |
| 2005/0071232 | A1* | 3/2005 | Frater ............... 705/16 |
| 2006/0143087 | A1 | 6/2006 | Tripp et al. |
| 2008/0065396 | A1* | 3/2008 | Marshall ............... 705/1 |
| 2009/0192898 | A1* | 7/2009 | Baril ............... 705/14 |
| 2010/0217675 | A1 | 8/2010 | Bookstaff |
| 2010/0217699 | A1 | 8/2010 | Bookstaff |
| 2010/0325048 | A1* | 12/2010 | Carlson et al. ............... 705/44 |
| 2012/0022958 | A1* | 1/2012 | de Sylva ............... 705/24 |
| 2012/0290420 | A1* | 11/2012 | Close ............... 705/17 |
| 2013/0006782 | A1* | 1/2013 | Schwarzkopf et al. ............... 705/17 |
| 2014/0052613 | A1 | 2/2014 | Tavakoli et al. |
| 2014/0100931 | A1* | 4/2014 | Sanchez et al. ............... 705/14.23 |

OTHER PUBLICATIONS

Non-Final Office Action mailed Jun. 26, 2014, U.S. Appl. No. 14/252,714 of Bell, B., et al., filed Apr. 14, 2014.
International Search Report and Written Opinion for International Application No. PCT/US2015/019518, mailed on Jun. 18, 2015.
Notice of Allowance mailed Jan. 5, 2015 for U.S. Appl. No. 14/252,714 of Bell, B., et al., filed Apr. 14, 2014.
Carr, A., "How Square Register's UI Guilts You Into Leaving Tips," Dec. 12, 2013, Retrieved from the Internet URL: http://www.fastcodesign.com/3022182/innovation-by-design/how-square-reg-isters-ui-guilts-you-into-leaving-tips, on Jul. 1, 2015, pp. 1-12.
Non-Final Office Action mailed Jul. 10, 2015, for U.S. Appl. No. 29/484,510, of Bell, B., filed Mar. 10, 2014.
Final Office Action mailed Jun. 7, 2016, for U.S. Appl. No. 29/484,510 of Bell, B., et al., filed Mar. 10, 2014.
Non-Final Office Action mailed Jun. 13, 2016, for U.S. Appl. No. 14/252,716 of Bell, B., et al., filed Apr. 14, 2014.

* cited by examiner

Joe Burrito

845 Market St.  
San Francisco, CA 94103  
(415) 343-6265

Jan. 18, 2012  
12:40pm  
Travis S

Receipt Y8N0  
Authorization 538936

AMEX 1234

| | |
|---|---|
| Modelo x 4 ($5.00 ea.) | $20.00 |
| Fish Taco x 2 ($5.00 ea.) | $10.00 |
| Carne Asada Burrito | $10.00 |
| Subtotal | $40.00 |
| Amount | $40.00 |

ADD A TIP

☐ 15% (Tip $6.00, Total $46.00)

☐ 20% (Tip $8.00, Total $48.00)

☐ 25% (Tip $10.00, Total $50.00)

☐ _____  _____  
    CUSTOM TIP    TOTAL

—302 x _____

I agree to pay the above total amount according to my card issuer agreement.

*FIG. 1A*

Joe Burrito

845 Market St.  
San Francisco, CA 94103  
(415) 343-6265

Jan. 18, 2012  
12:40pm  
Travis S

---

Receipt Y8N0  
Authorization 538936

AMEX 1234

---

Modelo x 4  
($0.50 ea.)

$2.00

Fish Taco x 2  
($0.50 ea.)

$1.00

Carne Asada Burrito

$2.50

---

Subtotal $5.50

---

Amount

$5.50

ADD A TIP

☐ $.50 (Total $6.00)

☐ $1.00 (Total $6.50)

☐ $2.00 (Total $7.50)

☐ _____  _____  
    CUSTOM TIP    TOTAL

— 304 x _____

I agree to pay the above total amount  
according to my card issuer agreement.

*FIG. 1B*

QUICK LEGEND RECEIPT SYSTEM

PRIORITY CLAIM

This application claims the benefit of U.S. Provisional Patent Application No. 61/950,697, entitled "QUICK LEGEND RECEIPT SYSTEM," filed on Mar. 10, 2014, which is incorporated by reference herein in its entirety.

BACKGROUND

With the prevalence of credit cards and other types of non-cash payment mechanisms in modern commerce, traditional manners of tipping (paying a gratuity to) a waiter in a restaurant or other full-service retail establishment can be inefficient and time-consuming. Before a customer, who may be in a hurry to leave for the next destination, writes down the tip amount on a credit card receipt, he or she needs to calculate a tip amount, which can be based on various factors such as the type of service or product rendered, the total amount of sale, the local custom specific to that geographical region and/or that industry, the quality of service, and so forth. Many consumers find this process difficult or annoying.

BRIEF DESCRIPTION OF THE DRAWINGS

One or more embodiments of the present invention are illustrated by way of example and not limitation in the figures of the accompanying drawings, in which like references indicate similar elements.

FIG. 1A illustrates an example of a transaction receipt with a quick legend section generated by a merchant point-of-sale (POS) system.

FIG. 1B illustrates another example of a transaction receipt with a quick legend section generated by a merchant POS system.

DETAILED DESCRIPTION

Figure 2:
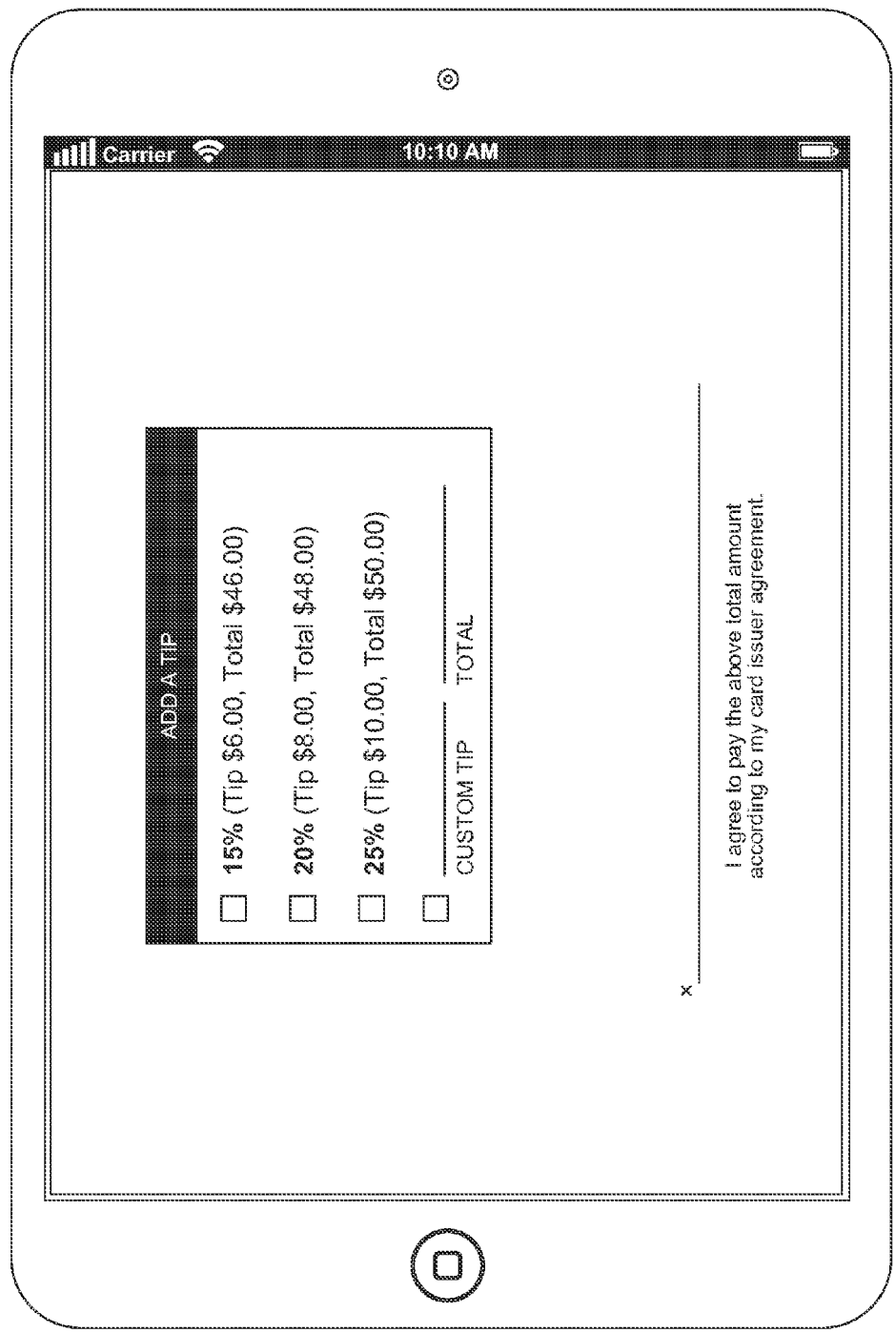
FIG. 2 illustrates an example interface provided (e.g., by a merchant POS system or by an mobile application on the customer's mobile device) to enable a customer to specify one tip option from a number of selectable tip options in a quick legend section.

References in this description to "an embodiment," "one embodiment," or the like, mean that the particular feature, function, structure or characteristic being described is included in at least one embodiment of the present invention. Occurrences of such phrases in this specification do not necessarily all refer to the same embodiment. On the other hand, the embodiments referred to also are not necessarily mutually exclusive.

It is observed that the aforementioned traditional process of tip calculation for credit card transactions is a cumbersome and undesirable process. For example, when a customer in a restaurant wishes to tip during a transaction being paid by credit card, the customer typically needs to specify (e.g., by writing) an amount of money that he or she wants to give as tip on a printed receipt. The customer typically needs to calculate the appropriate amount for the tip, writes the tip and the total amount on the receipt, and then signs the receipt. In addition, the customer, who may be unfamiliar with local tipping culture, inept in arithmetic of fractions or decimals, or simply in a hurry, can make mistakes that lead to under-tipping or over-tipping; the latter degrades the customer's shopping experience, and the former adversely affects the waiter's income. The traditional tipping process is also time-consuming and inefficient from the perspective of the merchant who may have to decipher all kinds of customer handwriting on printed receipts, some of which may be illegible or barely legible, and enter the recognized (or misrecognized) amount on the receipt into the merchant's point-of-sale (POS) system.

Introduced here, therefore, is a technique that enables more efficient tipping by use of a "quick legend" section (also called "legend section," "legend" or "tip section") on a sales receipt. Two examples of transaction receipts with quick legend sections generated by a merchant POS system implementing the techniques disclosed herein are shown in FIGS. 1A and 1B. The two examples can exist either as a physical (e.g., printed) receipt or an electronic (e.g., digital) receipt. The receipt, if existing in the electronic form, can be displayed on a monitor of the merchant's POS system and/or on a customer's mobile device (e.g., via an mobile application, an electronic message, etc.). As shown in FIGS. 1A and 1B, the quick legend sections 302 and 304 respectively indicate multiple options for tip amounts, one which the customer can select, such as by checking a checkbox. The technique reduces or even eliminates the need for a customer to perform cumbersome tip calculation. The technique is particularly advantageous when applied to a full-service retail establishment, such as a restaurant; in particular, the technique enables the customer to choose from one or more tip amount options provided on the receipt, as suggested by the merchant. The merchant can specify in advance, using his point-of-sale (POS) system, how the suggested options are to be generated in the quick legend. For example, as described further below, the technique introduced here can enable the merchant to take into account the total amount of sale, the local custom specific to that geographical region and/or that industry, and other factors. According to some examples, a merchant POS platform that implements one or more techniques introduced here enables a merchant to visualize and customize the manner in which the legend is placed on transaction receipt. In some variations, the merchant can control his POS system to toggle between traditional tip entry format and quick legends in a transaction receipt. In additional or alternative examples, the toggling may be automatic and based on the specific consumer (e.g., based on the specific consumer's past behavior where he simply put in a round number or tipped an exact percentage, or can be based on an indication of preference in a prior transaction, etc.). The toggling can also be based on the type of transaction. In some embodiments, the platform provides the merchant with the ability (and flexibility) to create and/or modify rules for what type(s) of legend a transaction receipt can have and when such legends should be generated.

As discussed in greater detail below, some examples of the merchant POS platform are configured to provide automated or semi-automated processes that can reduce the time and effort the merchant needs to spend on collating or inputting the customer tipping information (e.g., from transaction receipts) at end of the business day. Methods for creating or manufacturing printed receipts with the quick legend section are also introduced. Further, a software application which can be installed on a customer's mobile device and enable the customer to communicate his or her tip preference with the merchant POS platform is discussed.

In the following description, the example of a restaurant is used, for illustrative purposes only, to explain various aspects of the technique. Note, however, that the technique introduced here is not limited in applicability to restaurants or to any other particular kind of business. Additionally, the technique introduced here is not limited to use with credit cards or other types of payment cards; rather, the technique can be employed with essentially any suitable transaction that traditionally would involve the use of manually writing down a tip amount on a receipt. Additionally, the term "sale," as in point-of-sale (POS), refers to any type of payment-oriented transaction, including providing of a service, a lease or rental for example, and is not limited to an actual purchase. Note also that in this description, the term "user" generally refers to a customer (as opposed to a merchant), except where otherwise indicated, and except that the term "user interface" does not necessarily refer to an interface used by a customer, as will be apparent from the context.

Figure 3:
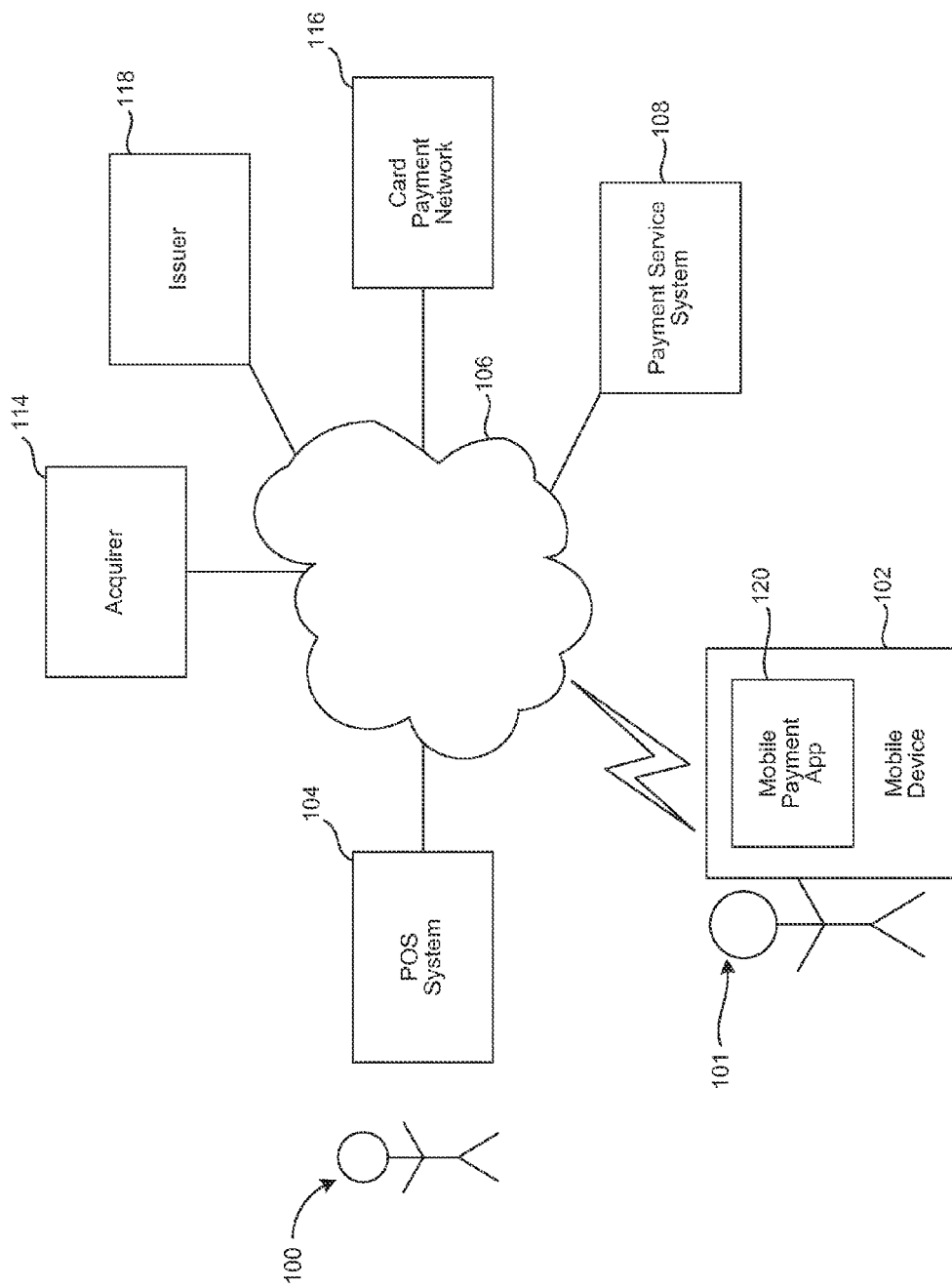
FIG. 3 illustrates an environment within which the quick legend receipt techniques introduced here can be implemented.

FIG. 3 illustrates an environment within which the quick legend receipt techniques can be implemented (e.g., in conjunction with a credit card transaction). The environment includes a merchant POS system of a merchant 100. Optionally, the environment can further include a mobile device 102 of a user 101 (also referred to as "customer" or "consumer"). The mobile device 102 can be, for example, a smart phone, tablet computer, notebook computer, or any other form of mobile processing device. In some implementations of the optional embodiment, a mobile payment application 120 can run on the user's mobile device 102 to interact with other components in the environment; for example, in one embodiment, the mobile payment application 120 can receive a digital version of a transaction receipt from the merchant. The environment also includes a computer system 114 of the merchant's acquirer, a computer system 118 of an issuing bank, a computer system 116 of a card payment network, and optionally, a computer system 108 of a payment service (hereinafter "payment service system 108"). Each of the aforementioned computer systems can include one or more distinct physical computers and/or other processing devices which, in the case of multiple devices, can be connected to each other through one or more wired and/or wireless networks. All of the aforementioned devices are coupled to each other through an internetwork 106, which can be or include the Internet and one or more wireless networks (e.g., a Wireless Fidelity (WiFi) network and/or a cellular telecommunications network).

In a traditional credit card transaction, the merchant swipes the user's credit card through a card reader at the merchant's POS system 104. The POS system 104 sends data read from the card (e.g., the cardholders name, credit card number, expiration date and card verification value (CW)) to the computer system 114 of the merchant's acquirer (hereinafter "acquirer 114"). The acquirer 114 sends this data to the computer system 116 of the card payment network (e.g., Visa or MasterCard) (hereinafter "card payment network 116"), which forwards the data to the computer system 118 of the issuing bank (hereinafter "issuer 118"). If the transaction is approved by the issuer 118, a payment authorization message is sent from the issuer 118 to the merchant POS system 104 via a path opposite of that described above.

Figure 4:
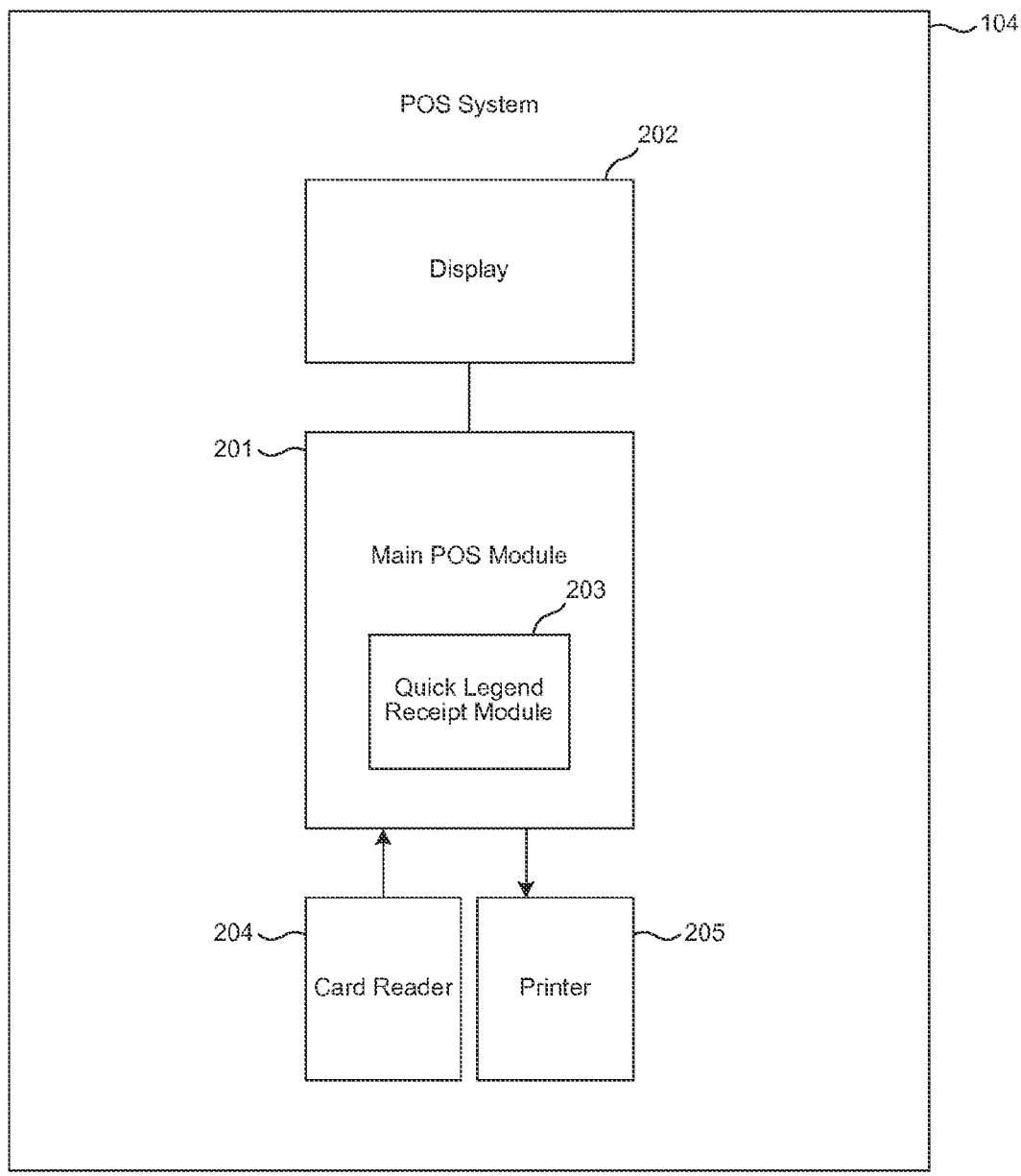
FIG. 4 illustrates an example of a merchant POS system implementing one or more techniques disclosed herein.

FIG. 4 illustrates an embodiment of the merchant POS system 104. Note that certain components that are not germane to this description may not be shown. Referring to FIG. 4, the merchant POS system 104 includes a main POS module 201 and a display 202. The main POS module 201 may be or include a software application, e.g., a main POS application 201, as henceforth assumed herein to facilitate description. Alternatively, it could be a hardware component (which may include a POS application and/or other POS software). The display 202 can be, for example, a touch-screen display, or a traditional non-touch display (in which case the merchant POS system 104 likely also includes a separate keyboard or other input device). The merchant POS system 104 also includes a card reader 204, such as a magnetic stripe card reader or a smartcard reader, and a receipt printer 205 for printing transaction receipts.

In accordance with some embodiments of the technique introduced here, the POS system 104 also includes a quick legend receipt (QLR) module 203 that communicates with the main POS application 201. The QLR module 203 may also communicate with the display 202, either directly or through the main POS application 201. The QLR module 203 can be software, hardware, or a combination thereof. As illustrated in FIG. 4, the QLR module 203 can be an integral part of the main POS application 201. Alternatively, although not shown in FIG. 4 for simplicity, the QLR module 203 can be logically separate from the main POS module but operate "along side" it. Other alternatives include binding virtual USB devices or implementing the QLR module 203 as a separate hardware device that connects between the merchant POS terminal and the card reader 204 and printer 205.

In some embodiments, the QLR module 203 can automatically generate a quick legend section on the sales receipt (e.g., which is then printed via the printer 205 and/or sent electronically to the customer) based on one or more factors specified by the merchant including, for example, the total amount of sale, the local custom specific to that geographical region and/or that industry, or other factors. In some implementations, the QLR module 203 can also take information on the customer's historical tipping habits (e.g., which can be stored locally on the POS system 104, or can be stored on the payment service system 108 and transmitted via the network 106) into account. The quick legend section enables the customer to choose (e.g., by checking a checkbox) from one or more options suggested by the merchant, who can specify in advance via the POS terminal how the suggested options are to be generated in the quick legend. Additional details on how the QLR module 203 can generate the quick legend section on the sales receipt are described with respect to FIG. 5.

Figure 5:
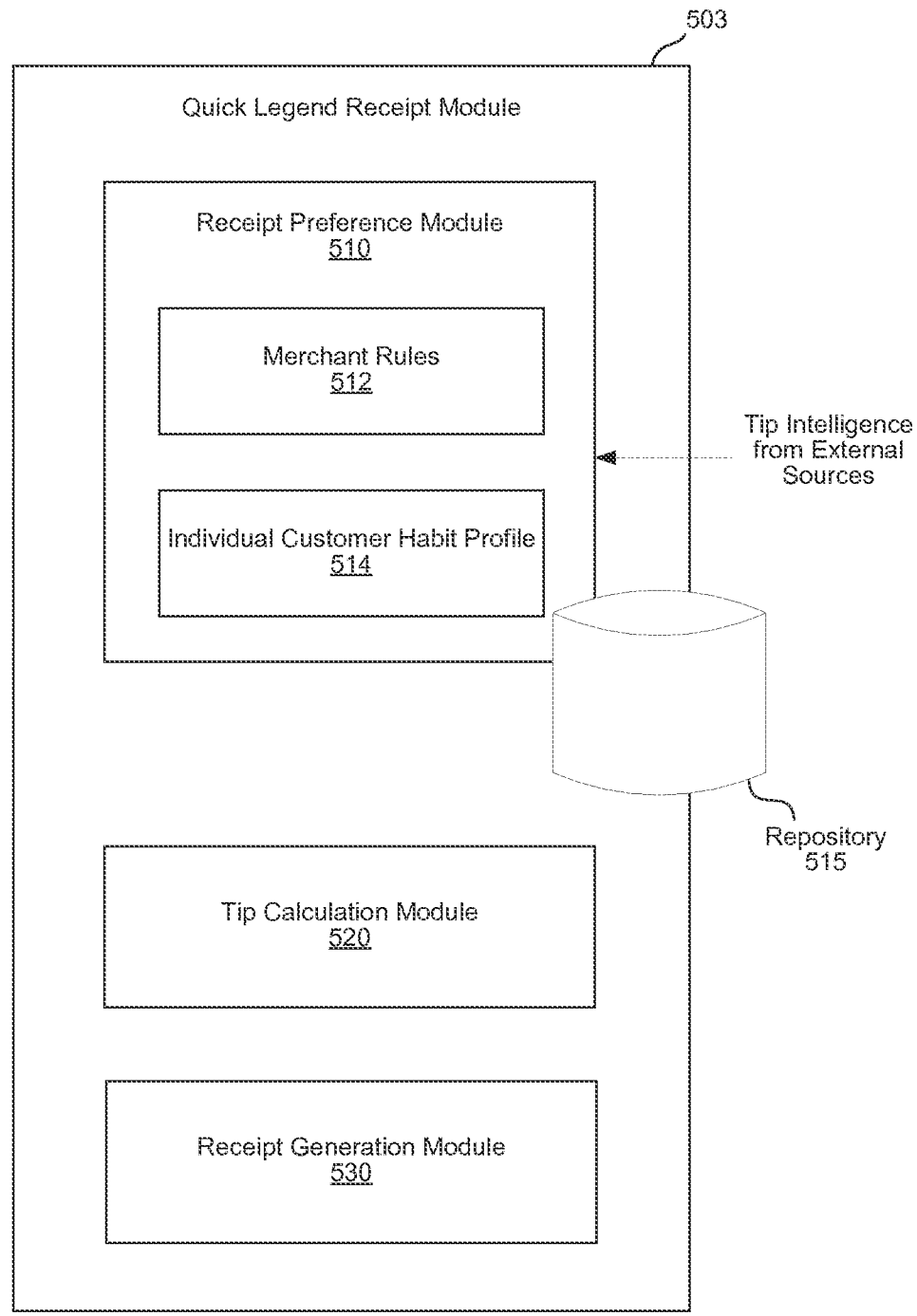
FIG. 5 illustrates an example of the quick legend receipt module of FIG. 4.
Figure 6:
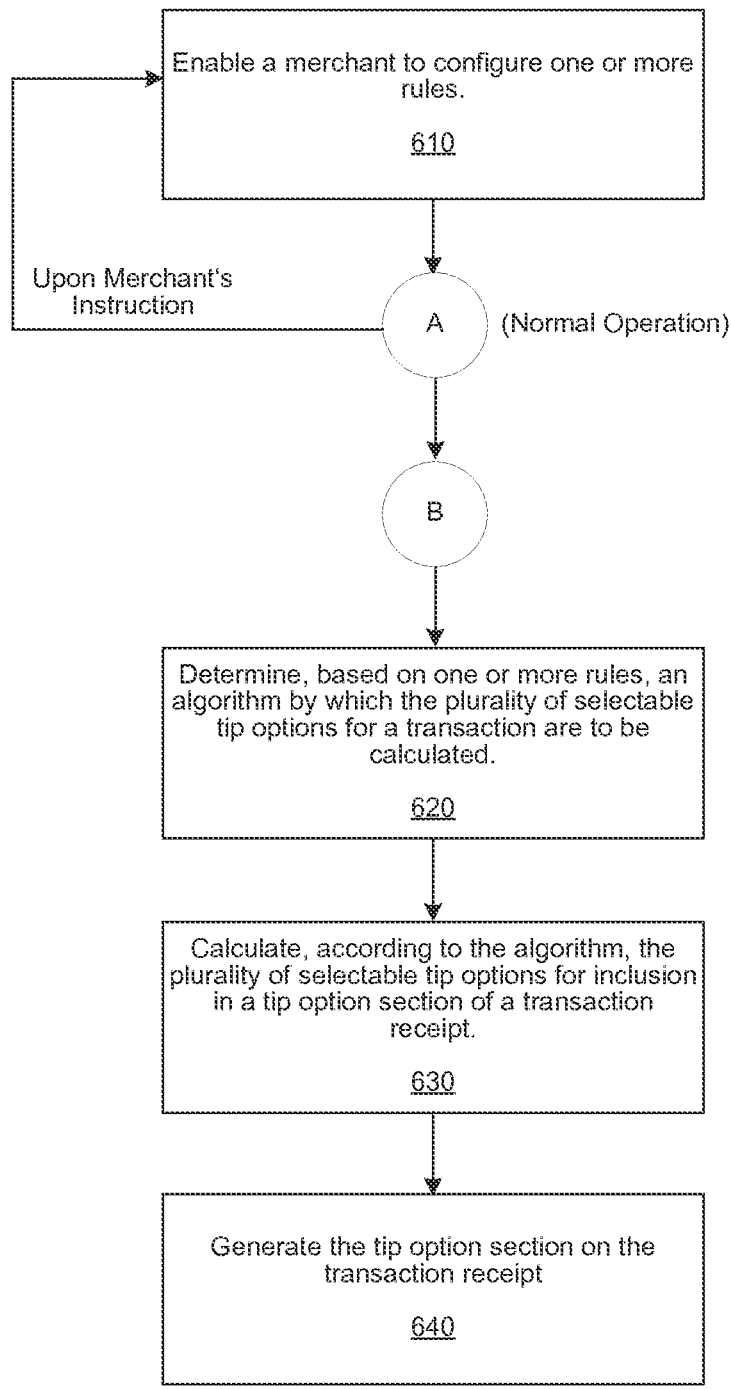
FIG. 6 is a flow diagram illustrating an example of a process for generating a quick legend receipt.

FIG. 5 illustrates a QLR module 503 which is an example implementation of the QLR module 203 of FIG. 4. FIG. 6 is a flow diagram illustrating an example of a process for the QLR module 503 to generate a quick legend receipt. The QLR module 503 includes a receipt preference module 510, which can include a merchant rules module 512 and an individual customer habit profile module 514. The QLR module 503 also includes a tip calculation module 520 and a receipt generation module 530. With reference to both FIGS. 5 and 6, the quick legend generation techniques are further explained.

Overall, the QLR module 503 provides a platform for the merchant to facilitate and tailor the tipping process for his or her customer(s) by customizing receipt generation and causing receipts to be printed or displayed according to specific rules and/or circumstances. Specifically, the receipt preference module 510 can enable (610) a merchant to specify and/or modify one or more rules for generating tipping information on transaction receipts. The one or more rules entered or configured by the merchant can be stored in a merchant rules module 512, which in this turn adjusts an algorithm that controls how each of the selectable tip options is calculated; in other words, by configuring the rules, the merchant can adjust the algorithm controlling how the POS system 104 calculates each of the selectable tip options. During normal operation of the POS system, the receipt preference module 510 can automatically determine (620) an algorithm by which a plurality of selectable tip options for a transaction are to be calculated. More specifically, the receipt preference module 510 can consolidate all the rules into an algorithm so that the algorithm incorporates and executes all the rules configured by the merchant. After the algorithm is determined by the receipt preference module 510, the tip calculation module 520 calculates (630) the plurality of selectable tip options according to the algorithm. The plurality of tip options are for inclusion in a tip option section (e.g., section 302, 304) of a transaction receipt for a transaction. With the amount of the selectable tip options calculated, the receipt generation module 530 generates (640) the tip option section on the transaction receipt. Then, after the transaction receipt is generated by the receipt generation module 530, the merchant can choose to send the transaction receipt to the customer electronically (e.g., by emails, text messages, through the mobile application 120, or other suitable electronic formats) and/or physically (e.g., by printing out the receipt via the printer module 205). Note that, for purposes of discussion herein, a "receipt" means an indication, which can be shown at any suitable stage during a transaction process, that conveys how much money a customer owes and gathers information about how much tip the customer would like to contribute; in other words, a receipt does not necessarily mean that it has to be generated when the transaction finalizes. For example, some embodiments of the receipt preference module 510 can show the information about how much the customer owes and can gather how much tip the customer wants to give before a "final receipt" is generated at the conclusion of the transaction process.

More specifically, the rules configured by the merchant can specify one or more conditions and how the algorithm should be affected or adjusted under those conditions. For example, the merchant can set up a first rule that the tip options are to be calculated differently based on whether a final transaction amount exceeds a predetermined amount (including sub-rules specifying how, more details discussed below). An algorithm is determined by the receipt preference module 510 that reflects or incorporates this first rule. The merchant can further set up a second rule that the tip options are to be calculated differently based on a time criterion (including sub-rules specifying how, more details discussed below). Then, the algorithm is adjusted by the receipt preference module 510 to reflect or incorporate this second rule. That is to say, the algorithm is a final formula that incorporates all the rules configured by the merchant (and, in some embodiments, the customer), and the algorithm is what the tip calculation module 520 follows when it calculates all the tip options. This rule configuration phase can be entered upon the merchant's request, for example, in a set-up phase before normal operation of the POS system. In some examples, the merchant can also modify the rules during normal operation.

In addition, the receipt preference module 510 enables the merchant to choose whether the quick tip legend section is to be included on the transaction receipt when the merchant completes the transaction. In one example, the merchant can use the QLR module 503 to specify rules on circumstances in which regular receipts should be issued (as compared to the quick legend receipts). In another example, the merchant is presented by the QLR module 503 with a check box to select whether a quick legend receipt should be printed when the merchant confirms sale for a transaction. As a variation, the merchant can provide a toggle option for the customer (e.g., via tip preferences set from customer's mobile device 102, discussed below) to choose whether to generate the quick legend section.

In some examples, the POS platform allows the merchant to specify or customize the rules by use of suitable computer languages (e.g., a script) or by a graphical user interface (GUI), or a combination thereof. In some implementations, the rules can be specified based on check options, for example, where the POS platform has check boxes for a number of factors, and where the merchant selects the factors to be used for generation of the quick legend. The check boxes can be used to set up algorithms that differentiate, for example, whether and how to generate tip options for transactions over a specified dollar amount, whether and how to generate tip options for a new customer, etc. The receipt preference module 510 can have a set of default rules upon which the merchant's configuration of rules can be based. In some embodiments, a repository 515 is coupled to the receipt preference module 510 and contains the rules governing generation of quick legend receipts. The repository 515 can be implemented in the form of a local database that resides within the POS platform 104, or a remote database server that communicates with the POS platform 104 (via the network 106). In some examples, the repository 515 can be implemented in the form of cloud-based data servers. Note that, without explicitly stating otherwise, any of the data structures described herein can be stored outside the QLR module 503.

As mentioned, during normal operation of the POS system, the receipt preference module 510 can automatically determine an algorithm by which a plurality of selectable tip options for a transaction are to be calculated. The automatic determination is based on the one or more rules as configured (as described herein) by the merchant. For example, the rules configured by the merchant include a condition related to a predetermined transaction amount, and the rules can specify that the algorithm be, for example: (a) if a total transaction price exceeds the predetermined transaction amount, then the receipt preference module 510 is to provide a set of percentages, of the total transaction price, on which the selectable tip options are to be calculated; and (b) if the total transaction price does not exceed the predetermined transaction amount, then the receipt preference module 510 is to provide a set of fixed amounts as the selectable tip options. (This example algorithm is discussed in more details with regard to FIG. 7.) It is noted that this example is merely one implementation of a rule and an algorithm. In addition to the examples given above, other rules on which the tipping options can be based can include, for example, geographical location, the identity of the individual customer, particular items on the menu, and so forth. Additional details on how the QLR module 503 can implement the rules and algorithms are discussed below.

Referring back to FIGS. 5 and 6, in some examples, the rules can cause the receipt preference module 510 to include a time criterion in the algorithm when determining percentages for the tip options. For example, the rules can set the algorithm in a way such that the determined percentages for a transaction around noon is lower than the determined percentages for a transaction in the evening; as a specific example, a tip scale of 10%, 15%, and 20% can be used for lunch, and a tip scale of 15%, 20%, and 25% can be used for dinner.

In some examples, the rules include a plurality of transaction categories, and each transaction category can indicate whether and at what percentages the tip options are to be generated. In this way, the merchant can assign a category to each service or product that the merchant provides, and specifies that whether (and if so, how much) the service or product should be tipped. This technique is particularly useful for a merchant who provides mixed type of services and products. For example, when a customer visits a hair salon for hair styling and then purchases hair products when he or she finishes, it may be appropriate to suggest tips only based on the hair styling service rendered but not the hair products. Similarly, when a customer visits a restaurant to dine in and then orders some take-out food, it may be appropriate to suggest tips only based on the dine-in part of the bill and not the take-out part.

With the disclosed techniques, the merchant can easily create a customized tipping experience for his or her customers. Further, the merchant can choose (e.g., by customizing the rules) to provide a visible indication of whether an item is included as a basis for the tip option calculations on the transaction receipt. The visible indication can include, for example, a mark, an asterisk, a description, or a combination thereof to ease the customer's mind by conveying to the customer what are included on the tip calculation and what are not.

Some implementations of the receipt preference module 510 also provide the ability to determine percentages, of a total transaction price, for the tip option calculations based on a past tipping behavior of an individual customer. In a particular implementation, by accessing the individual customer habit profile module 514, the receipt preference module 510 can determine whether and how to further customize the customer's tipping experience for a particular customer based on the customer's habits. The individual customer habit profile 514 can be established, and an individual customer identified, based on the customer's payment card information (e.g., by the name on the card, by the account number of the credit card, etc.). In some embodiments, the profile module 514 can store one habit profile for each individual customer. Some embodiments the profile module 514 can store a group habit profile for a group of customers (e.g., who belong to the same organization such as a company or a school). In variations, the habit profile can include detailed shopping history so that the merchant's POS system can give discounts or other promotional information (e.g., purchase suggestions) to frequent customers or members. Additionally or alternatively, the habit profile establishment and the customer identification can be based on an individual customer's user account with the payment service system 108. In some embodiments, the receipt preference module 510 can identify the individual customer by, for example, recognizing the customer's mobile device 102 (e.g., via a pre-registered International Mobile Station Equipment Identity (IMEI) number or other suitable numbers that can uniquely identify the mobile device 102) and/or recognizing the account that is logged onto the mobile payment application 120.

The individual customer habit profile 514 can document for an individual customer, for example, how many percent or a percent range that he or she typically uses, how he or she likes to tip (e.g., in terms of percentages) for a particular industry and/or for particular categories of products or services. The habit profile can also indicate one or more particular merchants the customer may want to tip more or with a different tip scale. In some examples, the habit profile can indicate whether the customer likes to tip to an exact number (e.g., rounding up or rounding down to a full-dollar amount), or to tip by an exact percentage (e.g., exactly 15%), and/or the customer's preference on the rounding (e.g., to a full-dollar amount, or to half-a-dollar amount). These items of information can be obtained (e.g., using statistical approaches to deduce) based on a prior tipping history of the individual customer and/or a tip preference (discussed below) which can be received from the customer's mobile device, for example. According to some embodiments, the receipt preference module 510 can put the customer's preferred tip option in or close to the middle of the quick tip legend section (e.g., sections 302, 304) so that it appears more prominent to the customer.

Figure 8:
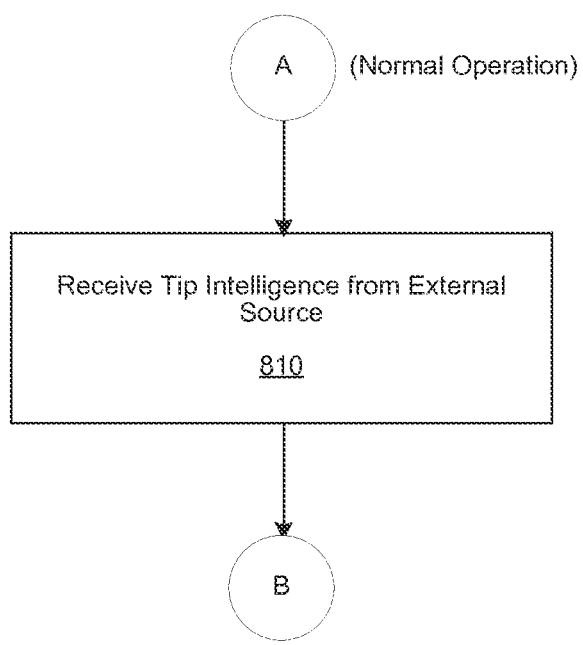
FIG. 8 is a flow diagram illustrating additional details which can be implemented with the example process of FIG. 6, in accordance with some examples.

Further, in one or more examples, the receipt preference module 510 can receive tip intelligence from external sources. A flow diagram illustrating additional details that can be implemented with the example process of FIG. 6 is illustrated in FIG. 8. Examples of tip intelligence received (810) by the receipt preference module 510 can include (1) a customer tip habit profile (e.g., from the payment service system server 108), (2) customer tip preference (e.g., from the customer's mobile device 102), and/or (3) local tip conventions (e.g., from the payment service system server 108). In one or more of these embodiments, the receipt preference module 510 can enable the merchant to control which of the rules can be affected by the received tip intelligence.

In some embodiments, the receipt preference module 510 can retrieve data indicative of the past tipping behavior of the individual customer from a remote server such as the server 108. Similar to the individual customer habit profile described above, the retrieved customer habit profile (which can also be stored in the individual customer habit profile module 514 or other suitable places) indicates a specific consumer's past behavior, for example, the customer's preference on whether to specify a round number as tip or an exact percentage, or other customer's habits that can be statistically deduced based on an indication of preference in one or more prior transactions. After gaining knowledge of what tip option is specified by the customer for the instant transaction, the receipt preference module 510 can update the stored data (e.g., locally on the POS system 104 (e.g., in the repository 515), and/or remotely in the server 108) indicative of the past tipping behavior.

In variations, the receipt preference module 510 can receive a tip preference from a device of a customer (e.g., the mobile device 102), and can determine the percentages on which the tip options are to be calculated based on the received tip preference. Similar to merchant-configurable rules, tip preference can include rules which can be used to cause the POS system to adjust the algorithm. In some examples, similar to the above-mentioned transaction categories which can be set by the merchant, the tip preference includes one or more transaction categories, and the customer can indicate in each transaction category whether and at what percentages the tip options are to be generated. The tip preference can specify each of the percentages for the selectable tip options. The tip preference can also specify whether the customer prefers to see the tip option section on the transaction receipt or not. As a practical example, in a hair salon, the customer can specify that he or she wants to tip the hair stylist but does not want to tip on retail products purchased. With the disclosed techniques, the merchant can specify during or prior to a transaction which item is for the hair stylist's service and which item is a retail product, and the receipt preference module 510 can automatically generate tip options based on these settings. Similarly, the merchant can choose (e.g., by customizing the rules) to have indicated, on the receipt, whether an item is included as a basis for the tip option calculations. These techniques make the customer more comfortable at selecting the pre-calculated tip options and allow the merchant to create a conscientious image in the customer's mind, all of which are desirable characteristics that may positively affect the merchant's business.

In addition, some examples of the receipt preference module 510 can receive information regarding local tip conventions or culture. This is particularly useful for a mobile merchant whose location moves frequently, such as a taxi driver or a food truck/mobile food stand. In these embodiments, the rules that the receipt preference module 510 uses in determining the algorithm can include conditions related to a type of merchant and/or a geographic location of transaction. The receipt preference module 510 then can determine appropriate percentages, of a total transaction price, on which the selectable tip options are to be calculated based on the type of merchant (e.g., as indicated by the merchant) and the geographic location of transaction (e.g., as detected by suitable modules in the POS system 104, such as a global satellite positioning (GPS) receiver (not shown in FIG. 4 for simplicity)). For example, depending on the geographic location of the transaction, it may be typical for merchants of retail product, take-out or fast food, or providers of accounting service to receive no tip; merchants of manicure, pedicure, haircut, carwash, taxi service, or full-service restaurant to receive tip. In some variations, similar to the above-mentioned transaction categories, the received local tip conventions can indicate some categories of merchants to receive more tips, and some categories of merchants to receive less tips. Depending on the implementation, the receipt preference module 510 can retrieve such appropriate percentages from a remote server (e.g., the payment service system 108) and/or from a look-up table which can be stored locally on the POS system 104 (e.g., in the repository 515).

According to some embodiments, the printer module 205 can include, for example, a blank receipt feeder and a printing mechanism. After receiving instructions from the merchant, the blank receipt feeder can feed a blank receipt, which has at least a top surface and a bottom surface, to the printing mechanism. Then, the POS system 104 can cause the printing mechanism in the printer module 205 to form a demarcation on the top surface of the blank receipt that visibly indicates a plurality of fields configured to receive a marking indicative of a selection of a tip option among a plurality of selectable tip options for a payment. Each selectable tip option represents a tip value.

In some embodiments, the demarcation is further formed so as to visibly indicate text, in at least one field and adjacent to a selectable tip option, stating a percentage of a total transaction value that the tip value represented by the selectable tip option equals. In some examples, the blank receipt is made of a substrate that is suitable for ink or laser printing. In many examples, the substrate comprises paper.

Figure 7:
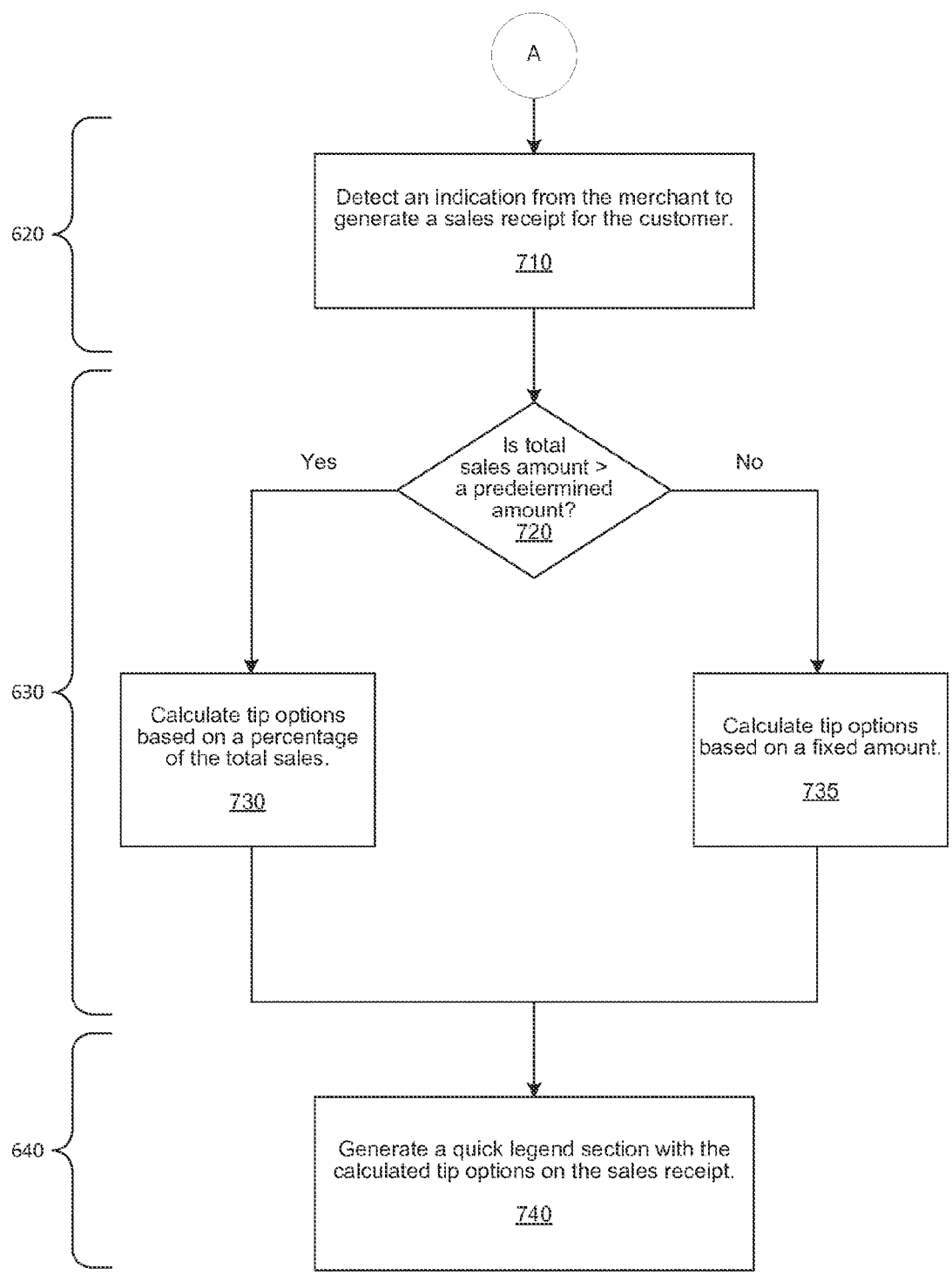
FIG. 7 is a flow diagram illustrating an example of an algorithm described in FIG. 6.

With the above in mind, FIG. 7 is a flow diagram illustrating an example of an algorithm described in FIG. 6. The algorithm can be performed by, for example, the QLR module 503 in the merchant POS system of FIG. 5 in generating a quick legend receipt. For illustration purposes, the algorithm of FIG. 7 calculates the tip options and generates the quick legend section based on a total sale of price; note, however, that the QLR module 503 can consider other/additional suitable factors as well, such as the type of product or service, etc.

As mentioned above, though not shown in the example process of FIG. 7, the merchant can input his or her preferences for tip options that are used in the disclosed quick legend receipt process, for example, during an initial or a set-up phase of the merchant POS system. Preferences may be stored locally in the POS system 104 (e.g., the merchant rules module 512) or at a remote location (e.g., the payment service system 108).

Then, during normal operation, the QLR module 503 first detects (710) an indication from the merchant to generate a sales receipt for a customer, for example, when the merchant finalizes the customer's account and enters a credit card number or other payment information of the customer. Next, the QLR module 503 then determines (720) whether the total sales amount is larger than a predetermined amount that is specified by the merchant.

If the total sales amount is larger than the predetermined amount, then the QLR module 503 calculates (730) tip options (amounts) based on a percentage of the total sales. The percentages on which the calculation is based can be predetermined by the merchant. For example, the merchant can specify that the tip should be calculated based on a percentage of the total sales when the total sales amount is larger than $10, and the merchant can specify the percentages to be 15%, 20%, and 25%. Then, as illustrated in the example receipt in FIG. 1A, if the total sales is $40 (which is larger than $10), the QLR module 503 automatically performs the tip calculation based on percentages of the total sales, and generates (740) on the receipt a quick legend section 302 that includes tipping options of 15%, 20%, and 25% of the total sales. In some embodiments, the results of the calculation, such as the tip amount and/or the total amount, can also be included in the quick legend section 302. The customer can then simply check off, circle, or otherwise indicate his or her selection of one of the options, directly on the receipt. Additionally, a custom tip option can be displayed to allow the customer to manually enter a tip and a total mount according to his or her preference.

In embodiments according to FIG. 7, if the total sales amount is not larger than the predetermined amount, then the QLR module 503 calculates (735) tip options based on a fixed amount. The fixed amounts can be predetermined by the merchant. Continuing with the above example, the merchant can specify the fixed amounts to be, for example, $1, $2, and $3, if the total sales is not larger than $10. Then, as illustrated in the example receipt in FIG. 1B, when the total sales is $5.50 (which is not larger than $10), the QLR module 503 automatically performs the tip calculation based on fixed amounts, and generates (740) on the receipt a quick legend section 304 which includes tipping options of $1, $2, and $3. Similar to the example shown in FIG. 1A, in some embodiments, the results of the calculation, such as the tip amount and/or the total amount, can also be included in the quick legend section 304. And, in some variations, a custom tip option can be displayed to allow the customer to manually enter a tip and a total mount according to his or her preference.

In this way, the techniques disclosed herein reduce or even eliminate the need for a customer to perform the cumbersome tip calculation, thereby increasing the efficiency in tipping, reducing the chances for unintentional under-tipping or over-tipping, and enabling a better overall consumer experience. This technique also makes it easier for the merchant, since the merchant will less frequently have to strain to read barely legible customer writing on a receipt to determine the tip amount or the total.

As an additional feature, the QLR module 503 can also reduce the time and effort the merchant needs to spend on inputting customer tipping information at end of the business day, by providing a systematic, digitized way of inputting such information. For example, as described further below, the QLR module 503 can enable the merchant to easily learn see (e.g., by displaying on the display 202) what specific tip option is chosen by each customer. In some implementations, the QLR module 503 displays to the merchant, on a display device, the receipt with the quick legend in the same way that the consumer sees it. Some variations of the QLR module 503 only display to the merchant a portion of the receipt that is relevant to quick tip entering, for example, the quick legend.

As mentioned above, if the quick legend receipt is in the electronic form, then an interface can be used (e.g., by the merchant POS system 104 and/or by the mobile application 120 on the customer's mobile device 102) to enable the customer to specify one tip option from a number of selectable tip options in the quick legend section. An example of such interface (with the signature section being optional depending on embodiments) is shown in FIG. 2. Specifically, in some embodiments, the POS system can send the transaction receipt electronically to the customer, and the customer can specify what tip amount she likes to give (e.g., by selecting one tip option or entering a tip amount) on the electronic receipt. In other embodiments, the merchant can allow the customer (e.g., by turning the POS system to face the customer) to specify what tip amount the customer likes to give directly on the POS system. In either of these cases, because the tip amount information is already in the electronic form, the tip amount can be entered into the POS system in an automated manner. However, the same cannot be said with printed receipts.

It is recognized in the present disclosure that, conventionally after the customer writes a tip amount on a printed receipt, there is still a need for the merchant to manually input the tip amount into the POS system. The aggregate amount of time spent by the merchant on this manual input procedure each day can be substantial and can reduce productivity for the merchant. Accordingly, in addition to being configured to automatically generate a transaction receipt that includes a section indicating a plurality of selectable tip options, some embodiments of the QLR module 503 can identify a one of the plurality of selectable tip options specified by a customer on the printed receipt.

More specifically, some examples of the QLR module 503 can identify the one of the plurality of selectable tip options specified by the customer on the printed receipt in one or more of the ways described below. In some implementations, the QLR module 503 can display (e.g., via the display 202 on the POS system 104) the plurality of selectable tip options and prompt the merchant to input to the POS system 104 the one of the plurality of selectable tip options as specified by the customer on the printed receipt. For example, after the generating the transaction receipt, the QLR module 503 can display, on a display device of the POS system 104, the same quick legend section as shown on the transaction receipt to the merchant to prompt the merchant to identify which tip option selected by the customer on the printed sales receipt is.

In additional or alternative examples, the POS system 104 includes a camera (not shown for simplicity), and the QLR module 503 can capture an image of the printed receipt with the camera. Then, the QLR module 503 can identify the one tip option specified by the customer based on the image. For example, the QLR module 503 can use an image analysis and/or optical character recognition (OCR) module (not shown for simplicity) to differentiate a selected tip option from a non-selected tip option on the printed receipt.

In variations, the printed receipt includes a machine-readable optical pattern (e.g., a barcode, a matrix barcode, a quick response (QR) code, etc.) that uniquely identifies the transaction receipt, and the QLR module 503 can recognize the transaction receipt by the machine-readable optical pattern. After the receipt is recognized, the QLR module 503 can display the plurality of selectable tip options to the merchant and prompt the merchant to input to the POS system 104 the one of the plurality of selectable tip options as specified by the customer on the printed receipt.

Moreover, if the one tip option specified by the customer is a custom tip option (e.g., the custom tip option shown in section 302, FIG. 1A), the QLR module 503 can prompt the merchant to manually enter a tip amount. As a variation, the QLR module 503 can use the above-said image analysis module to automatically recognize a tip amount in the custom tip option, for example, by using optical character recognition (OCR) techniques. Further, if a confidence score of automatic recognition (e.g., OCR) of the tip amount is below a predetermined threshold, the QLR module 503 can display the image on the POS system 104 (e.g., on the display 202) and prompt the merchant to review and confirm the tip amount.

Overall, the QLR module 503 enables the merchant's POS system 104 to enter the tip options chosen in each transaction in an automated manner by receiving digitized copies of receipts with customer-selected tip options (e.g., from the mobile payment application 120) or by recognizing customer-selected tip options (e.g., by using optical character recognition) on scanned copies of printed receipts. In this way, the QLR module 503 further automates the merchant's tip collating process.

As mentioned above, in one aspect of the techniques introduced here, the mobile payment application 120 that operates on the customer's mobile device 102 also provides the consumer with the ability to customize or specify how the tipping options should look on his or her receipts. For example, the mobile payment application 120 can communicate with the merchant's POS system 104 and/or the payment service system 108, either directly or indirectly via network 106 and/or another suitable communication medium, to transmit the aforementioned tip preference.

Similar to the above-said merchant configurable rules, the tip preference can be rule-based and can also be based on prior tipping practice, current geographical location, type of product or service purchased, and so forth. In various examples, the tip preference can be manually entered or configured by the customer on the mobile device 102 via the application 120. Additionally or alternatively, the tip preference can also be automatically gathered (e.g., using statistical ways to deduce) from the customer's past tipping behavior. Similar to those rules which the merchant can customize, tip options can be generated based on sales amount, merchant type (i.e., goods or services merchant offers, such as full-service restaurant, fast food restaurant or food truck, car wash, accounting service, barber shop, etc.), and/or other suitable factors. For example, the rules can be specified such that (1) for a fast food merchant, the tips are to be $1, $2, and $3; and (2) for a professional service (e.g., a tax accountant), no tip is to be generated. Also, in some examples, the rules can be based on customer habits. In some embodiments, a tipping scale with percentages commensurate with a customer's tipping habit can be automatically generated (e.g., 15%, 18%, and 20% versus 15%, 20%, and 25%). Further, the mobile application 120 can receive information regarding local tip conventions or culture (e.g., how other customers have tipped in this region, for this merchant, or for this type of merchant) in a similar manner as the tip intelligence mentioned above. Some examples of mobile application 120 can allow the customer to specify how the selectable tip options for a particular merchant (e.g., a chain coffee shop), a particular store (e.g., one specific store of the chain coffee shop), or a particular type of merchants (e.g., coffee shops).

Note that, in many instances, the mobile application 120 can enable the customer to customize his or her tip preference in similar ways to how the merchant POS system can enable the merchant to customize tipping experience for the customers; as such, both the POS system and the mobile application can be used to implement any suitable quick legend receipt techniques introduced here.

Figure 9:
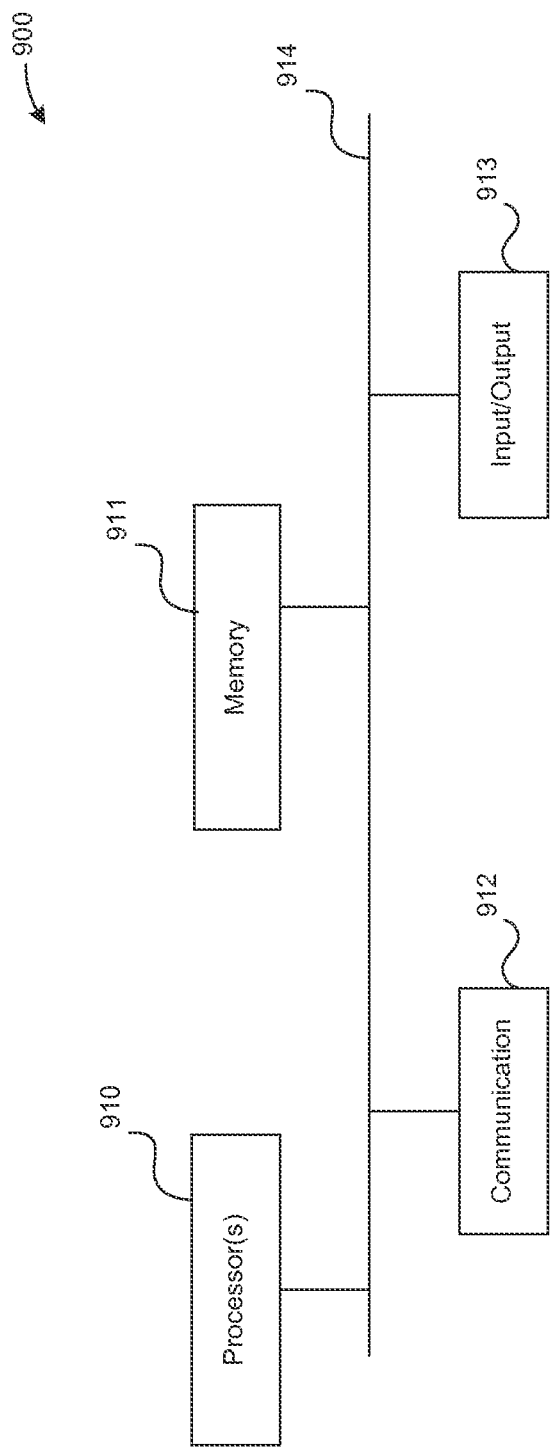
FIG. 9 is a high-level block diagram showing an example of processing system in which at least some operations related to the generation of the disclosed quick legend receipt(s) can be implemented.

FIG. 9 is a high-level block diagram showing an example of a processing device 900 that can represent any of the devices described above, such as the mobile device 102, the merchant POS system 104, payment service system 108, acquirer system 114, card payment network 116, or issuer system 118. As noted above, any of these systems may include two or more processing devices such as represented in FIG. 9, which may be coupled to each other via a network or multiple networks.

In the illustrated embodiment, the processing system 900 includes one or more processors 910, memory 911, a communication device 912, and one or more input/output (I/O) devices 913, all coupled to each other through an interconnect 914. The interconnect 914 may be or include one or more conductive traces, buses, point-to-point connections, controllers, adapters and/or other conventional connection devices. The processor(s) 910 may be or include, for example, one or more general-purpose programmable microprocessors, microcontrollers, application specific integrated circuits (ASICs), programmable gate arrays, or the like, or a combination of such devices. The processor(s) 910 control the overall operation of the processing device 900. Memory 911 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 911 may store data and instructions that configure the processor(s) 910 to execute operations in accordance with the techniques described above. The communication device 912 may be or include, for example, an Ethernet adapter, cable modem, Wi-Fi adapter, cellular transceiver, Bluetooth transceiver, or the like, or a combination thereof. Depending on the specific nature and purpose of the processing device 900, the I/O devices 913 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium can include recordable/non-recordable media (e.g., read-only memory (ROM), random access memory (RAM), magnetic disk storage media, optical storage media, flash memory devices, etc.).

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described. Accordingly, the specification and drawings are to be regarded in an illustrative sense rather than a restrictive sense.

What is claimed is:

1. A method of operating a point-of-sale (POS) system including a software application that, when installed on a computer device, is operable to cause the computer device to perform the method, the method comprising:
    enabling, via a display of the POS system, a user of the POS system to specify one or more rules, the one or more rules including one or more logic statements regarding an attribute of a transaction, wherein the one or more logic statements form an algorithm controlling how the POS system calculates a plurality of selectable tip options based on the attribute of the transaction;
    calculating, by the POS system, the plurality of selectable tip options based on the algorithm;
    generating, by the POS system, a transaction receipt that indicates the plurality of selectable tip options for the transaction based on the one or more rules specified by the user of the POS system;
    causing, by the POS system, the transaction receipt to be printed as a printed receipt;
    receiving an input that identifies a one of the plurality of selectable tip options specified by a customer on the printed receipt; and
    determining both a tip amount specified by the customer and a total amount of the transaction based on the input, wherein the selectable tip options enable the customer to specify, using a single selection, the one of the plurality of selectable tip options on the printed receipt, wherein the receiving comprises:
- capturing an image of the printed receipt; and
- identifying, based on the captured image, the one tip option specified by the customer.

2. The method of claim 1, wherein the receiving step comprises:
- displaying, on the POS system, the plurality of selectable tip options; and
- prompting the user to input to the POS system the one of the plurality of selectable tip options specified by the customer on the printed receipt.

3. The method of claim 1, wherein the identifying step comprises using an image analysis module to differentiate a selected tip option from a non-selected tip option on the printed receipt.

4. The method of claim 1, wherein causing the transaction receipt to be printed as a printed receipt comprises causing the printed receipt to include a machine-readable optical pattern that uniquely identifies the transaction receipt, and wherein the receiving step comprises:
- recognizing the transaction receipt by the machine-readable optical pattern;
- displaying the plurality of selectable tip options to the user; and
- prompting the user to input to the POS system the one of the plurality of selectable tip options as specified by the customer on the printed receipt.

5. The method of claim 1, further comprises:
- if the one tip option specified by the customer is a custom tip option which allows the customer to write a tip amount on the printed receipt, prompting the user to manually enter a tip amount.

6. The method of claim 1, further comprises:
- if the one tip option specified by the customer is a custom tip option, using an image analysis module to automatically recognize a tip amount in the custom tip option; and
- if a confidence score of automatic recognition of the tip amount is below a predetermined threshold, displaying the image on the POS system.

7. The method of claim 1, wherein the plurality of selectable tip options are printed with indications showing what a total after-tip amount will be in each tip option.

8. The method of claim 1, further comprising:
- enabling, via a user interface of the POS system, the user to specify the one or more rules.

9. The method of claim 1, wherein the one or more rules comprise:
- if a total transaction price exceeds a predetermined transaction amount, producing a set of percentages, of the total transaction price, on which the selectable tip options are to be calculated; and
- if the total transaction price does not exceed the predetermined transaction amount, producing a set of fixed amounts as the selectable tip options.

10. The method of claim 1, wherein the attribute of the transaction includes at least one of: a total amount of the transaction, a time of the transaction, or a location of the transaction.

11. A point-of-sale (POS) system comprising:
- a computing device that has a processor, a display, and a memory; and
- a software application that, when installed on the computer device, is operable to cause the computer device to:
  - enable, via the display, a user of the POS system to specify one or more rules, the one or more rules including one or more logic statements regarding an attribute of a transaction, wherein the one or more logic statements form an algorithm controlling how the POS system calculates each of a plurality of selectable tip options based on the attribute of a transaction;
  - calculate, by the processor, the plurality of selectable tip options based on the algorithm;
  - generate, based on the one or more rules, a transaction receipt that includes a section indicating the plurality of selectable tip options for the transaction;
  - cause the transaction receipt to be printed as a printed receipt;
  - receive an input that identifies a one of the plurality of selectable tip options specified by a customer on the printed receipt; and
  - determine, by the processor, both a tip amount specified by the customer and a total amount of the transaction based on the input,
  - wherein the selectable tip options enable the customer to specify, using a single selection, the one of the plurality of selectable tip options on the printed receipt,
  - wherein the processor is further configured to:
    - capture an image of the printed receipt; and
    - identify, based on the captured image, the one tip option specified by the customer.

12. The system of claim 11, wherein the processor is further configured to, in performing the receiving step:
- display the plurality of selectable tip options to the user; and
- prompt the user to input to the POS system the one of the plurality of selectable tip options as specified by the customer on the printed receipt.

13. The system of claim 11, wherein the processor is further configured to, in performing the identifying step, differentiate a selected tip option from a non-selected tip option on the printed receipt.

14. The system of claim 11, wherein the printed receipt further includes a machine-readable optical pattern that uniquely identifies the transaction receipt, wherein the processor is further configured to, in performing the receiving:
- recognize the transaction receipt by the machine-readable optical pattern;
- display the plurality of selectable tip options to the user; and
- prompt the user to input to the POS system the one of the plurality of selectable tip options as specified by the customer on the printed receipt.

15. The system of claim 11, wherein the processor is further configured to:
- if the one tip option specified by the customer is a custom tip option which allows the customer to write a tip amount on the printed receipt, prompt the user to manually enter a tip amount.

16. The system of claim 11, wherein the processor is further configured to:
- if the one tip option specified by the customer is a custom tip option, use an image analysis module to automatically recognize a tip amount in the custom tip option; and if a confidence score of automatic recognition of the tip amount is below a predetermined threshold, display the image on the POS system.

17. The method of claim 1, further comprising:
receiving a tip preference from an external source that is remote from the POS system; and
determining the selectable tip options based on the received tip preference.

18. The system of claim 11, wherein the POS system is controlled by the one or more rules to:
if a total transaction price exceeds a predetermined transaction amount, produce a set of percentages, of the total transaction price, on which the selectable tip options are to be calculated; and
if the total transaction price does not exceed the predetermined transaction amount, produce a set of fixed amounts as the selectable tip options.

19. The system of claim 11, wherein the POS system is further configured to:
receive a tip preference from an external source that is remote from the POS system; and
determine the selectable tip options based on the received tip preference.

20. The system of claim 11, wherein the attribute of the transaction includes at least one of: a total amount of the transaction, a time of the transaction, or a location of the transaction.

21. A method of operating a point-of-sale (POS) system including a software application that, when installed on a computer device, is operable to cause the computer device to perform the method, the method comprising:
enabling, via the POS system, a user of the POS system to specify one or more rules, the one or more rules including one or more logic statements regarding an attribute of a transaction, wherein the one or more logic statements form an algorithm controlling how the POS system calculates a plurality of selectable tip options based on the attribute of the transaction;
calculating, by the POS system, the plurality of selectable tip options based on the algorithm;
generating, by the POS system, a transaction receipt that indicates the plurality of selectable tip options for the transaction based on the one or more rules specified by the user of the POS system;
receiving an input that identifies a one of the plurality of selectable tip options specified by a customer on the transaction receipt; and
determining both a tip amount specified by the customer and a total amount of the transaction based on the input, wherein the selectable tip options enable the customer to specify, using a single selection, the one of the plurality of selectable tip options on the transaction receipt,
wherein the receiving comprises:
capturing an image of the printed receipt; and
identifying, based on the captured image, the one tip option specified by the customer.

22. The method of claim 21, wherein the one or more rules comprise:
if a total transaction price exceeds a predetermined transaction amount, producing a set of percentages, of the total transaction price, on which the selectable tip options are to be calculated; and
if the total transaction price does not exceed the predetermined transaction amount, producing a set of fixed amounts as the selectable tip options.

23. The method of claim 21, wherein the one or more rules comprise:
if a time of the transaction is after a predetermined time, producing a first set of percentages, of the total transaction price, on which the selectable tip options are to be calculated; and
if the time of the transaction time is not after the predetermined time, producing a second set of percentages, of the total transaction price, on which the selectable tip options are to be calculated.

24. The method of claim 21, wherein the one or more rules comprise:
selecting, in the transaction, only a number of items that are marked suitable for tipping as a basis for the calculation of the selectable tip options.

25. The method of claim 21, wherein the receiving step comprises:
displaying, on the POS system, the plurality of selectable tip options; and
prompting the user to input to the POS system the one of the plurality of selectable tip options specified by the customer on the transaction receipt.

26. The method of claim 21, wherein the receiving step comprises:
capturing an image of the transaction receipt; and
identifying, based on the image, the one tip option specified by the customer.

27. The method of claim 26, wherein the identifying step comprises using an image analysis module to differentiate a selected tip option from a non-selected tip option on the transaction receipt.

28. The method of claim 21, wherein the plurality of selectable tip options include indications showing what a total after-tip amount will be in each tip option.

* * * * *